United States Patent [19]

Kurimoto et al.

[11] 3,713,978

[45] Jan. 30, 1973

[54] PROCESS FOR PREPARING POWDERY STARCH SUGARS

[75] Inventors: Masashi Kurimoto, Okayama-shi; Mamoru Hirao, Okayama, both of Japan

[73] Assignee: Harashibara Company, Okayama-shi, Okayama, Japan

[22] Filed: Nov. 19, 1969

[21] Appl. No.: 878,238

[30] Foreign Application Priority Data

Nov. 22, 1968 Japan .....................43/85844

[52] U.S. Cl. ...............................195/31 R
[51] Int. Cl. ...............................C12b 1/00
[58] Field of Search .........195/31; 99/142, 199, 203; 127/43, 30, 29, 58, 61; 159/4, 8, 48

[56] References Cited

UNITED STATES PATENTS

| | | | |
|---|---|---|---|
| 3,535,123 | 10/1970 | Heady | 195/31 |
| 2,728,678 | 12/1955 | Sharp | 99/199 |
| 3,565,765 | 2/1971 | Heady et al. | 195/31 R |
| 3,519,054 | 7/1970 | Cauathaio et al. | 159/48 R |
| 3,236,687 | 2/1966 | Smith et al. | 127/58 |
| 2,900,256 | 8/1959 | Scott | 159/48 |
| 3,560,343 | 2/1971 | Armbruster et al. | 195/31 R |
| 3,615,723 | 10/1971 | Meade | 159/48 R |
| 3,560,345 | 2/1971 | Yokobayashi et al. | 195/31 R |

Primary Examiner—A. Louis Monacell
Assistant Examiner—Gary M. Nath
Attorney—Browdy and Neimark

[57] ABSTRACT

A process for producing starch sugars involves subjecting starch slurries to the action of acids or combinations of various amylases and converting dextrins, produced by saccharification of starch, into straight-chain malt dextrins using an $\alpha$-1,6-glucosidase that decomposes the $\alpha$-1,6-glucoside bonds, or the branching bonds of starch, thereby facilitating the saccharifying reaction and, at the same time, converting the oligosaccharides or dextrins into straight-chain malt dextrins or oligosaccharides, and thereby preparing a starch sugar solution of a composition different from that of ordinary starch syrups and which is less viscous, and then finishing the liquor easily by spray drying to a powdery product.

6 Claims, No Drawings

PROCESS FOR PREPARING POWDERY STARCH SUGARS

This invention relates to a process for producing starch sugars by subjecting starch slurries to the action of acids or combinations of various amylases and converting dextrins, produced by saccharification of starch, into straight-chain malt dextrins using an α-1,6-glucosidase that decomposes the α-1,6-glucoside bonds, or the branching bonds of starch, thereby facilitating the saccharifying reaction and, at the same time, converting the oligosaccharides or dextrins into straight-chain malt dextrins or oligosaccharides, and thereby preparing a starch sugar solution of a composition different from that of ordinary starch syrups and which is less viscous, and then finishing the liquor easily by spray drying to a powdery product.

Ordinary acid-converted starch syrups of low saccharification degrees contain high proportions of dextrins of branched structures having relatively high molecular weights and therefore they are too viscous for smooth filtration and ion exchange processes of purification. The high viscosity also renders spray drying difficult. It is for this reason that those syrups are usually subjected to spray drying in low concentrations, e.g., of about 60 percent.

On the other hand, it is possible, in accordance with the present invention, to produce starch syrups free from branched dextrins and hence of lower viscosity than ordinary acid- or enzyme-converted starch syrups of the same D.E. values, by taking advantage of the characteristic of the α-1,6-glucosidase developed by the present inventors to decompose selectively the α-1,6-glucoside bonds which represent the branching bonds in a starch molecule, and either decomposing gelatinized starch thereby first into straight chain-amylose, thus enabling β-amylase to act fully, or by using the α-1,6-glucosidase in the course of saccharification of starch with various amylases, thereby converting the dextrins of the resulting starch syrup into straight-chain malt dextrins.

For the reasons stated above, the use of α-1,6-glucosidase with various amylases is not only useful in reducing the viscosity of products but in producing starch syrups whose compositions are controllable with comparative ease, including the production of those syrups composed of a preponderance of maltose and a minor proportion of glucose, or for syrups which comprise major proportions of glucose, or for syrups which consist essentially of oligosaccharides.

Thus, the starch syrups or starch sugars obtained through the utilization of α-1,6-glucosidase are allowed to have freely chosen, unusual sugar compositions and, in addition, considering their dextrin structures, they have less viscosity than ordinary starch syrups of the same D.E. values, and therefore the spray drying of the sugar solution is easily accomplished.

As already stated, the conventionally prepared high-viscosity starch syrups with low D.E. values present difficulties in being spray dried unless they are diluted to concentrations lower than 60 percent. The starch syrups obtained in accordance with the present process, by contrast, generally exhibit such low viscosity that they are sprayed with extreme ease in concentrations ranging from 70 to 80 percent through high pressure nozzles using pressures of 100 to 150 kg/cm$^2$.

The starch syrups which are produced from starch slurries using combinations of various amylases and α-1,6-glucosidases and the method of saccharification according to the present invention are illustrated by the following examples. The α-1,6-glucosidases used were obtained for the purpose of the invention from various type cultures or from useful strains chosen from among the strains separated from soils in various locations. To cite a few examples, they included the enzymes produced by the bacteria of the genera Escherichia (ATCC 21073), Pseudomonas (ATCC 21262), Lactobacillus (ATCC 8008), Micrococous (IFO 3345), Nocardia (IFO 3384) and Aerobacter (ATCC 8724), which are described in detail, respectively, in the specifications of U.S. Pat. applications Ser. Nos. 749,288, 733,326 now patent 3,560,345, and 810,293 now abandoned. Culture fluids of these strains were filtered, and the clarified solutions so obtained were used as enzyme solutions.

Using these α-1,6-glucosidases and amylases, sugar solutions of desired sugar compositions, sweetness, and viscosity were prepared. These solutions were purified, concentrated, and then subjected to spray drying. For spray drying, the drying column described in the specification of Japanese Pat. Publication No. 7076/1969 was employed. Into a parallel flow of hot air, each sugar solution was sprayed by means of triple high-pressure pumps at pressure ranging from 150 to 100 kg/cm$^2$. Further particulars will be given in the following description of examples.

Pulverization of the sugar solutions may be accomplished by a vacuum drying technique as well. Experimentally, each sugar solution in a concentration of 80 percent heated with steam at 5 kg/cm$^2$ was extruded into a vacuum of −700 mm for drying, and the dried product was pulverized to a powdery state. The apparent specific gravity of the product obtained by this technique was quite low.

The following examples are described as employing the spray drying technique alone.

EXAMPLES

Raw material starches used were those of corn, white potato, sweet potato, wheat, sago, and also high-amylose starch, etc. Each starch was first purified and treated to prepare a starch slurry having a concentration of 30 to 40 percent. For the liquefaction and gelatinization, a continuous liquefying equipment was used. Since the saccharification needs a lengthy period of time, a batch-type saccharification tank was provided for that purpose.

To begin with, the starch slurry was adjusted to pH 5.0, pumped into the continuous liquefier equipped with an agitator and, while being vigorously agitated, the charge was suitably liquefied or gelatinized. For example, it was either rapidly gelatinized by heating to 160° C with the supply of live steam or was liquefied by heating to about 90° C, following the addition of α-amylase. Next, the starch, liquefied to a suitable D.E. value, was rapidly cooled to a temperature and adjusted to a pH both suitable for the enzyme to be subsequently introduced. The liquefied starch was either subjected to the action of an α-1,6-glucosidase for decomposition of the branched structure of the starch-like amylopectin to straight-chain malt dextrins which in turn were decomposed with the addition of a suitable saccharogenic amylase; or the liquefied starch was subjected to the action of a suitable saccharogenic amylase for decomposition and then, with the addition of the α-1,6-glucosidase, the branched dextrins were decomposed to malt dextrins. By either method, a starch syrup having a desired composition, viscosity, and sweetness was prepared. The temperature, pH, and time for the amylolysis varied according to the type of enzyme employed.

The saccharified solution thus obtained was heated to deactivate the enzymes, decolored with active charcoal, and further decolored and desalted with ion exchange resins. Following the purification, the solution was concentrated. The resulting solution, which was less viscous than ordinary acid-converted starch syrups and starch sugars of the same D.E. values, was further concentrated to a high concentration of 70 to 80 percent, and then spray dried.

The spray dryer was a cylindrical column having an effective height of more than 10 meters. From a high pressure nozzle mounted on the top of the column, the concentrated sugar solution was sprayed. The hot drying air was supplied as a downward flow from the top of the drying column. The air temperature used ranged from 80° to 150° C. The powdery starch sugars dried in this way were collected on a moving bed of wire screen stretched in the lower part of the column and the mass was cooled by cold air introduced from below the moving bed. The powdery product on the moving bed was continuously taken out of the column, collected in a hopper, sieved, and packed in a bag without being exposed to the atmospheric air and humidity. The end products obtained in the manner described were powdery products of small globular shape having water contents of one to three percent and were easy to handle, though the moisture absorption varied according to the degree of saccharification or D.E. attained. The conditions for saccharification and spray drying were as tabled below.

TABLE I

| Example number | I | II | III | IV | V | VI | VII |
|---|---|---|---|---|---|---|---|
| Starch | Sweet potato | Corn | Corn | High amylose | Potato | Sago | Cassava |
| Concentration, percent | 40 | 35 | 35 | 30 | 40 | 35 | 40 |
| Liquefaction: | | | | | | | |
| Enzyme or acid, unit/g. starch | None | None | Oxalic acid, pH 3.5 | Oxalic acid, pH 4 | C10 | C15 | C15 |
| Temperature, °C | 163 | 165 | 120 | 160 | 90 | 90 | 90 |
| D.E. | 2.5 | 2.0 | 3.0 | 3.0 | 2.1 | 15 | 35 |
| 1st saccharification: | | | | | | | |
| Enzyme, u./g | L30 | L40-B10 | L20-R2 | B10 | P30-B5 | C5 | P30 |
| Temperature, °C | 50 | 50 | 45 | 60 | 45 | 60 | 45 |
| pH | 6.0 | 6.0 | 5.5 | 5.5 | 6.0 | 6.0 | 6.0 |
| Hold time, hr | 25 | 20 | 20 | 8 | 20 | 20 | 25 |
| 2nd saccharification: | | | | | | | |
| Enzyme, u./g | C20 | C20 | C20 | I20 | | P20 | Isomerase |
| Temperature, °C | 45 | 50 | 45 | 45 | | 45 | 50 |
| pH | 6.0 | 6.0 | 6.0 | 5.5 | | 6.0 | 6.5 |
| D.E. | 40 | 60 | 70 | 57 | 30 | 27 | 49 |
| Hold time, hr | 10 | 10 | 20 | 10 | | 10 | 20 |
| Spray drying: | | | | | | | |
| Original liquid concentration, percent | 75 | 80 | 80 | 77 | 75 | 75 | 80 |
| Air temperature, °C | 160 | 150 | 165 | 150 | 180 | 155 | 165 |
| Water content, percent | 1.0 | 0.8 | 0.5 | 0.7 | 2.0 | 0.5 | 0.8 |
| Main components | Malt dextrin | Maltose | Glucose, malt dextrin | Maltose, 90% | Maltose, malt dextrin | Malt dextrin | Malt dextrin, glucose, fructose |

α-Amylase :(C) commercially available liquefying enzyme.
β-Amylase :(B) extracted from wheat bran.
Gluc-amylase(Rhizpous) :(R).
Aerobacter pullulanase : (P).
Pseudomonas enzyme :(I).
Lactobacillus enzyme :(L).

What is claimed is:

1. A process for producing special powdery starch sugars of various compositions from starch slurries comprising liquefying said starch slurry to a D. E. of 2–3; subjecting said liquefied starch to the action of α-1,6-glucosidase produced from the bacteria of the genus Lactobacillus (ATCC 8008), thereby preparing a sugar solution of a low viscosity having a composition principally of malt dextrins free from branched structure and, to lesser extents, of other sugars; adjusting the concentration to 70–80 percent; and then drying the highly concentrated solution by spray drying through nozzles using a pressure of 100–150 kg/cm$^2$.

2. A process for preparing powdery starch sugars according to claim 1 wherein said spray drying step is accomplished by spraying into air heated to 80°–150° C. in the upper part of the drying chamber, collecting the resulting powder on a gas-permeable moving bed in the lower part, and passing a stream of cooling air upwardly through said gas-permeable bed.

3. A process in accordance with claim 1 wherein said starch is liquefied by a technique selected from the group consisting of heating to about 160° C., treating with acid, and treating with α-amylase.

4. A process in accordance with claim 3 wherein said liquefied starch is subjected in a separate stage to the action, of an enzyme other than α-1,6-glucosidase, said other enzyme being selected from the group consisting of α-amylase, β-amylase and isomerase.

5. A process in accordance with claim 4 wherein said action of α-1,6-glucosidase is effected in a first stage along with glucoamylase, followed by treatment with said α-amylase in said separate stage.

6. A process for producing powdery starch sugars of various compositions, which comprises liquefying a starch slurry containing acid or liquefying enzyme with heating to a D.E. of 2–3; saccharifying the liquefied starch with one or two enzymes selected from the group consisting of β-amylase, gluco-amylase and isomerase, adding thereto α-1,6-glucosidase produced by the bacteria of the genus Lactobacillus (ATCC 8008) during the initial or middle stage of the previous saccharification; purifying and concentrating the saccharified solution; and then drying the concentrated solution by spray drying at a high pressure.

* * * * *